United States Patent [19]
Greenfield et al.

[11] Patent Number: 5,760,836
[45] Date of Patent: Jun. 2, 1998

[54] FIFO FEEDBACK AND CONTROL FOR DIGITAL VIDEO ENCODER

[75] Inventors: James David Greenfield, Binghamton; Barbara Ann Hall, Endwell; John Mark Kaczmarczyk, Endicott; Agnes Yee Ngai, Endwell, all of N.Y.

[73] Assignee: International Business Machines Corporation, Armonk, N.Y.

[21] Appl. No.: 701,422

[22] Filed: Aug. 22, 1996

[51] Int. Cl.$^6$ ............................................. H04N 7/36
[52] U.S. Cl. ............................................. 348/419
[58] Field of Search .................. 348/419, 405; 382/251

[56] References Cited

U.S. PATENT DOCUMENTS

| | | | |
|---|---|---|---|
| 5,038,209 | 8/1991 | Hang | 348/419 |
| 5,121,346 | 6/1992 | McClure | |
| 5,159,447 | 10/1992 | Haskell et al. | |
| 5,255,090 | 10/1993 | Israelsen | |
| 5,287,182 | 2/1994 | Haskell et al. | |
| 5,323,272 | 6/1994 | Klingler | |
| 5,485,593 | 1/1996 | Baker | |
| 5,502,499 | 3/1996 | Birch et al. | |
| 5,566,208 | 10/1996 | Balakrishnan | 348/419 |
| 5,654,760 | 8/1997 | Ohtsuki | 348/419 |

FOREIGN PATENT DOCUMENTS

| | | |
|---|---|---|
| 60-225935 | 11/1985 | Japan . |
| 92306755 | 10/1992 | Japan . |
| 2253725 | 9/1992 | United Kingdom . |

OTHER PUBLICATIONS

IBM TDB vol. 37, No. 04A, Apr. 1994, Multi Byte Dataflow Technique with Single Byte Controls, pp. 167–173.

IBM TDB vol. 37, No. 02B, Feb. 1994, Simple Data De–Interleaver, pp. 605, 606.

IBM TDB vol. 39, No. 03, Mar. 1996, Color Display System, pp. 85, 86.

*Primary Examiner*—Amelia Au
*Attorney, Agent, or Firm*—Richard M. Goldman

[57] ABSTRACT

Method and apparatus for encoding a digital video image stream in an encoder. The encoding includes spatial compression of still images in the digital video image stream and temporal compression between the still images. The spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image. The temporal compression is carried out by reconstructing the run length encoded, quantized, discrete cosine transformed image of the macroblock, searching for a best match macroblock, and constructing a motion vector between them. This forms a bitstream of runlength encoded, quantized, discrete cosine transformed macroblocks and of motion vectors. This bitstream is passed to and through a FIFO buffer to a transmission medium. The number of run length encoded bits is fed back to the encoder for calculation of the quantization factor, to thereby avoid overrunning the buffer and interrupting the transmission.

11 Claims, 5 Drawing Sheets

FIFO FEEDBACK AND CONTROL FOR DIGITAL VIDEO ENCODER

FIELD OF THE INVENTION

The invention relates to digital video encoding, such as MPEG-2 compliant digital video encoding and HDTV compliant encoding. More particularly, the invention relates to management of the encoder output FIFO buffer. The invention differs from the use of the FIFO output buffer to control the quantization factor during encoder in the MPEG-2 Standard in that the buffer described in the MPEG-2 Standard documents is a virtual buffer, and the MPEG-2 Standard documents are silent as to how to control the virtual FIFO buffer. The FIFO buffer described herein is an actual buffer, requiring a finite number of machine cycles for loading and for unloading.

BACKGROUND OF THE INVENTION

One example of an emerging video compression standard is the Moving Picture Experts Group ("MPEG") standard. Within the MPEG standard, video compression is defined both within a given picture, i.e., spatial compression, and between pictures, i.e., temporal compression Video compression within a picture is accomplished by conversion of the digital image from the time domain to the frequency domain by a discrete cosine transform, quantization, variable length coding, and Huffman coding (both collectively referred to as run length coding). Video compression between pictures is accomplished via a process referred to as motion compensation, in which a motion vector is used to describe the translation of a set of picture elements (pels) from one picture to another.

For MPEG2 video encoding, FIFOs are often used to capture video data which has been compressed to the MPEG2 video standard, that is digital video data that has been spatially and temporally compressed, as by discrete cosine transformation, quantization, variable length coding, and Huffman coding, and motion estimation. In many applications the FIFOs are unloaded 'real time' for transmission of full motion video through a transmission medium. Because of this, control of the data rate, after spatial compression and temporal compression, into the FIFOs is critical so that data is not corrupted in the encoding process. Normally, some type of processor or controller will be monitoring the encoding process and moving data from the FIFOs for transmission. At certain times the host processor/controller may be busy with other tasks and will be unable to remove the data fast enough from the FIFOs to the transmission medium. This may result in lost data when the FIFOs are full and cannot accept more information.

OBJECTS OF THE INVENTION

It is a primary object of the invention to manage buffer fullness to avoid loss of data.

It is a further object of the invention to monitor and control the fullness of the FIFOs including adjusting the bitrate coming from the encoder into the FIFOs in order to prevent the FIFO buffers from overrun.

It is a still further object of the invention to provide an automatic reset of the FIFOs in the event of overrun so that the FIFO read process can be restarted.

It is a still further object of the invention to provide a feedback structure with a control signal to assist the host in the read operation of the FIFOs.

SUMMARY OF THE INVENTION

This invention monitors the fullness of the FIFOs and adjusts the bitrate coming from the encoder into the FIFOs in order to prevent the FIFO buffers from overrun. If the FIFOs do overrun an automatic reset of the FIFOs can also be issued and the encoding process can be restarted. In addition, as a result of the feedback structure, a control signal is also provided to assist the host in the read operation of the FIFOs.

The bitrate of a compressed digital video data stream, as an MPEG2 compliant data stream or an HDTV compliant data stream, can be adjusted by varying the amount of quantization for the frequency coefficients in a macroblock after the discrete cosine transformation (DCT). The expedient wherein the quantization factor or step size is controlled solely as a function of the "fullness" of the FIFO buffer is described in the MPEG2 Standard documentation. The scaling factor by which this is performed uniformly over a macroblock is referred to as a quantization factor or "step size". Therefore, by using a large step size more compression will result which reduces the compressed stream bitrate but also reduces picture quality. A small stepsize increases the bitrate and picture quality.

Thus, according to our invention there is provided method and encoder apparatus for encoding a digital video image stream. The encoding includes spatial compression of still images in the digital video image stream and temporal compression between the still images. The spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image. The temporal compression is carried out by reconstructing the run length encoded, quantized, discrete cosine transformed image of the macroblock, searching for a best match macroblock, and constructing a motion vector between them. This forms a bitstream of runlength encoded, quantized, discrete cosine transformed macroblocks and of motion vectors. This bitstream is passed to and through a FIFO buffer to a transmission medium. The number of run length encoded bits is fed back to the encoder for calculation of the quantization factor, to thereby avoid overrunning the buffer and interrupting the transmission.

THE FIGURES

The invention may be understood by reference to the FIGURES appended hereto.

DETAILED DESCRIPTION OF THE INVENTION

The invention relates to MPEG-2 and HDTV compliant encoders and encoding processes. The encoding functions performed by the encoder include data input, motion estimation, macroblock mode generation, data reconstruction, entropy coding, and data output. Motion estimation and compensation are the temporal compression functions. They are repetitive functions with high computational requirements, and they include intensive reconstructive processing, such as inverse discrete cosine transformation, inverse quantization, and motion compensation.

Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous picture to predict where a block of pixels will be in a subsequent picture or pictures, for example, with motion vectors, and to write the result as "predicted pictures" or "P" pictures. More particularly, this involves making a best estimate or prediction of where the pixels or macroblocks of pixels of the i+1$^{th}$ picture will be in the i$^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
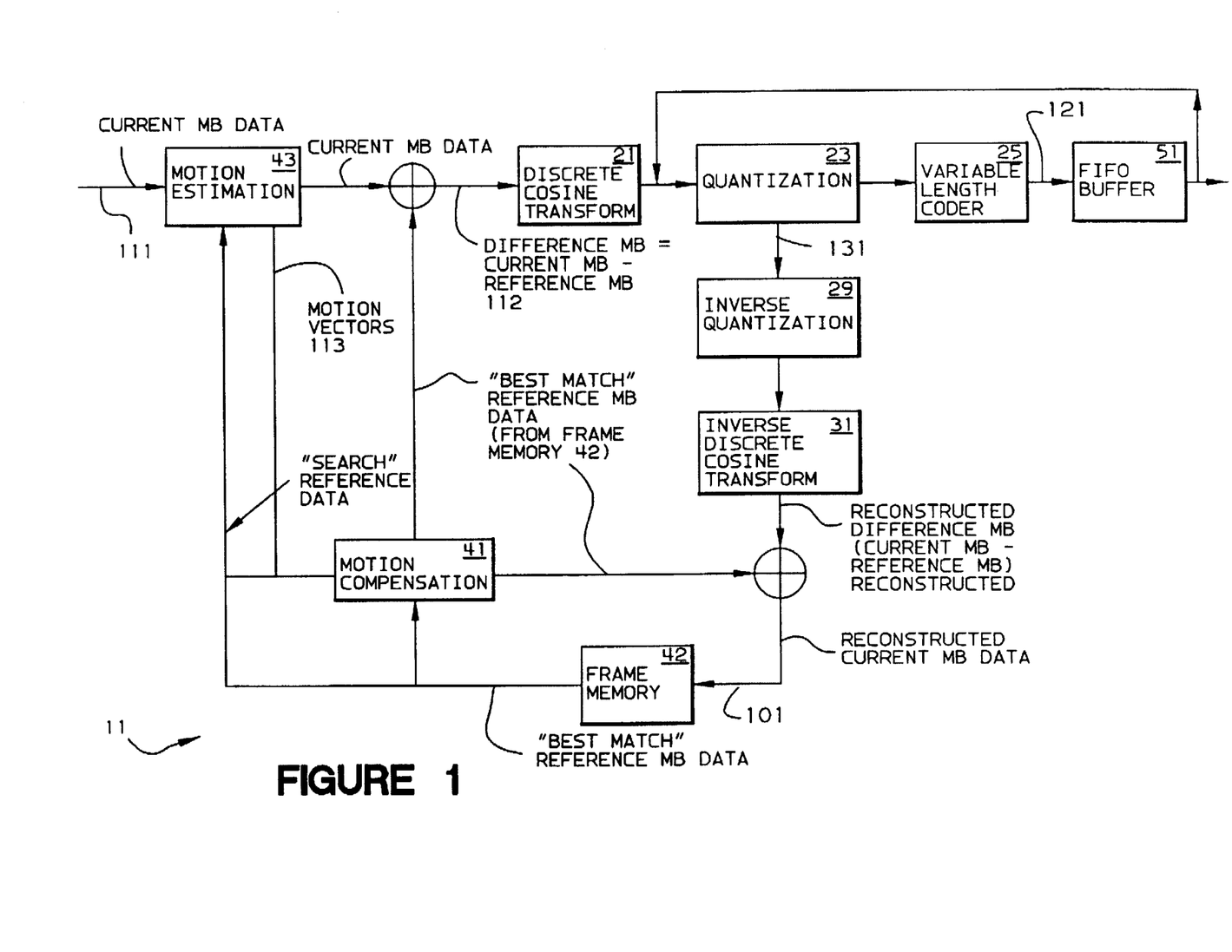
FIG. 1 shows a flow diagram of a generalized MPEG2 compliant encoder 11, including a discrete cosine transformer 21, a quantizer 23, a variable length coder 25, an outlet FIFO buffer 51 with feedback back to the quantizer 23, an inverse quantizer 29, an inverse discrete cosine transformer 31, motion compensation 41, frame memory 42, and motion estimation 43. The data paths include the i$^{th}$ picture input 111, difference data 112, motion vectors 113 the picture output 121, the feedback picture for motion estimation and compensation 131, and the motion compensated picture 101. This FIGURE has the assumptions that the i$^{th}$ pictures exists in Frame Memory or Frame Store 42, and that the i+1$^{th}$ picture is being encoded with motion estimation.

For purposes of illustration, a generalized flow chart of MPEG compliant encoding is shown in FIG. 1. In the flow chart the images of the i$^{th}$ picture and the i+1$^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the i$^{th}$ picture to the i+1$^{th}$ picture.

As shown in FIG. 1, in the encoding process, the images of the i$^{th}$ picture and the i+1$^{th}$ picture are processed in the encoder 11 to generate motion vectors which are the form in which, for example, the i+1$^{th}$ and subsequent pictures are encoded and transmitted. An input image 111X of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
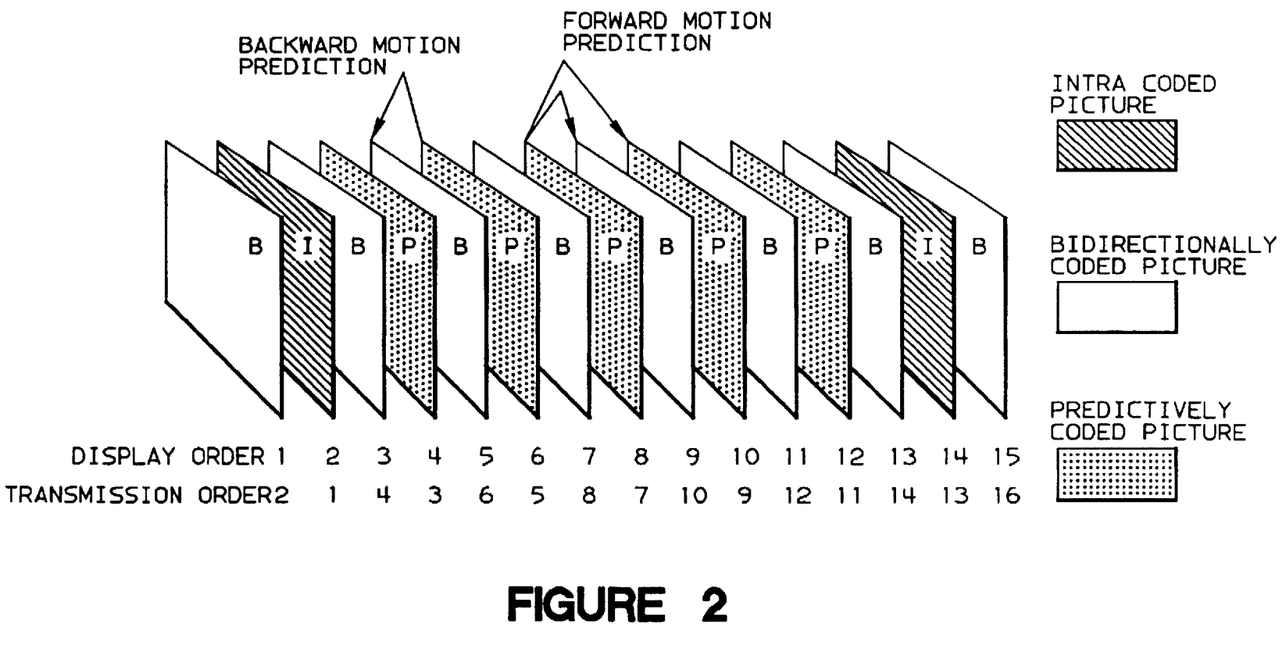
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures.

Figure 3:
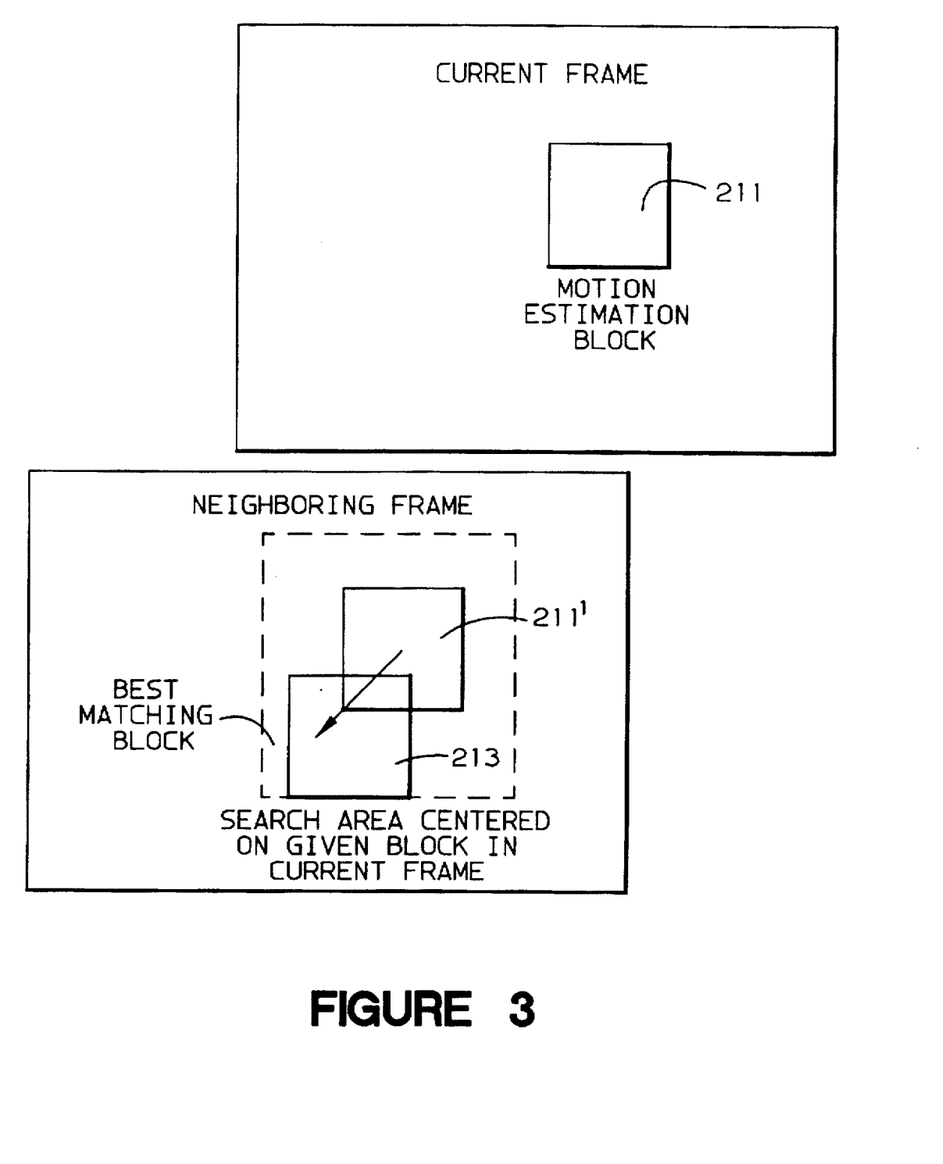
FIG. 3 illustrates the search from the motion estimation block in the current frame or picture to the best matching block in subsequent or previous frame or picture. Elements 211 and 211' represent the same location in both pictures.
Figure 4:
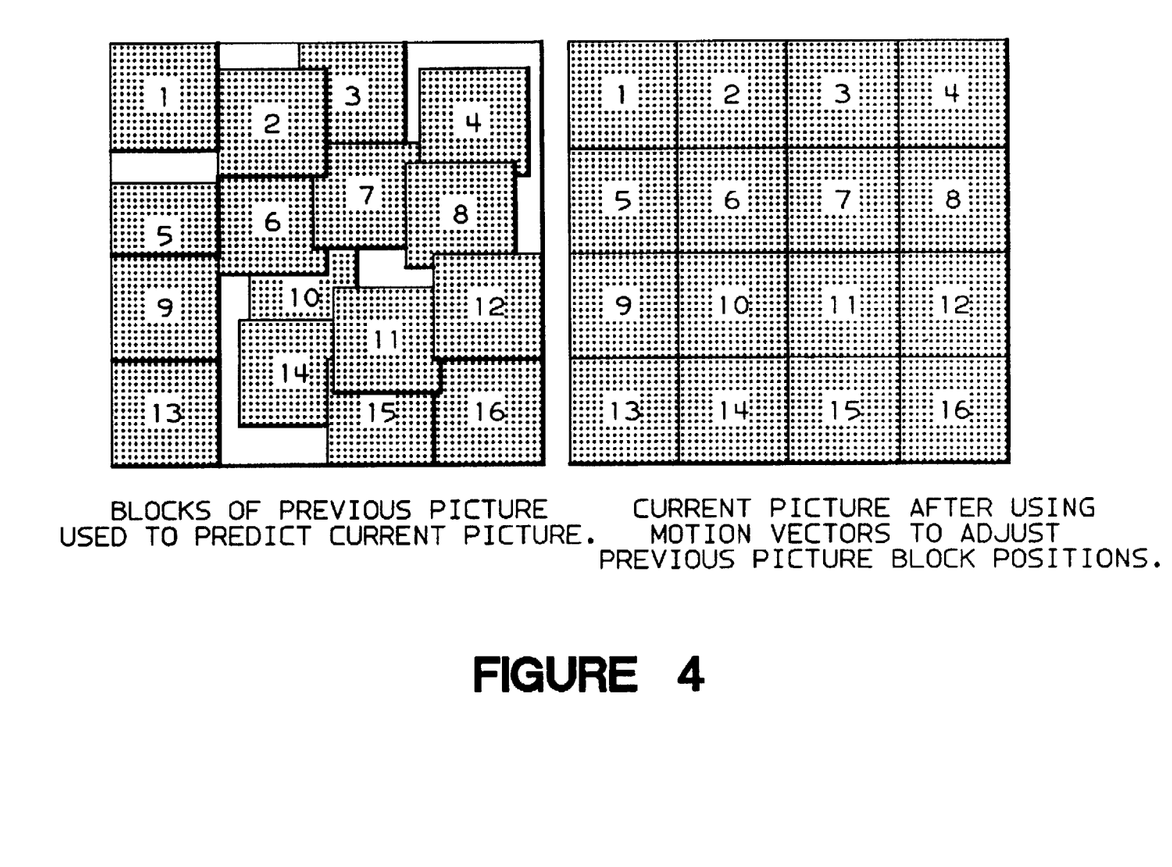
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an i+1$^{th}$ picture throughout a region of the previous picture to find the best match macroblock 213 (211' is the same location as 211 but in the previous picture). Translating the macroblocks in this way yields a pattern of macroblocks for the i+1$^{th}$ picture, as shown in FIG. 4. In this way the i$^{th}$ picture is changed a small amount, e.g., by motion vectors and difference data, to generate the i+1$^{th}$ picture. What is encoded are the motion vectors and difference data, and not the i+1$^{th}$ picture itself. Motion vectors translate position of an image from picture to picture, while difference data carries changes in chrominance, luminance, and saturation, that is, changes in color and brightener.

Returning to FIG. 3, we look for a good match by starting from the same location in the i$^{th}$ picture 211' as in the i+1$^{th}$ picture 211X. A search window is created in the i$^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

Even with spatial and temporal compression, the bitrate of the compressed digital video data stream is still very high.

The bitrate of a compressed digital video data stream, as an MPEG2 compliant data stream or an HDTV compliant data stream, can be adjusted by varying the amount of quantization for the frequency coefficients in a macroblock after the discrete cosine transformation (DCT). The scaling factor or quantization factor by which this is performed uniformly over a macroblock is referred to as "step size". Therefore, by using a large step size more compression will result which reduces the compressed stream bitrate but also reduces picture quality. Conversely, a small stepsize increases the bitrate and picture quality.

The step size adjustment can be based on many other encoding parameters besides and/or in addition to the measured output FIFO buffer fullness. One such factor in the calculation of step size or quantization factor is the difference between the allocated bit budget and the actual number of bits previously used to encode the bitstream. The number of bits used to encode the bitstream (E) is provided as feedback to a processor performing the stepsize calculation used for quantization. The bitrate feedback is provided from a Variable Length Encoder (VLE) and Header Generation Unit (HDU) which are used to assemble the MPEG2 bitstream.

Figure 5:
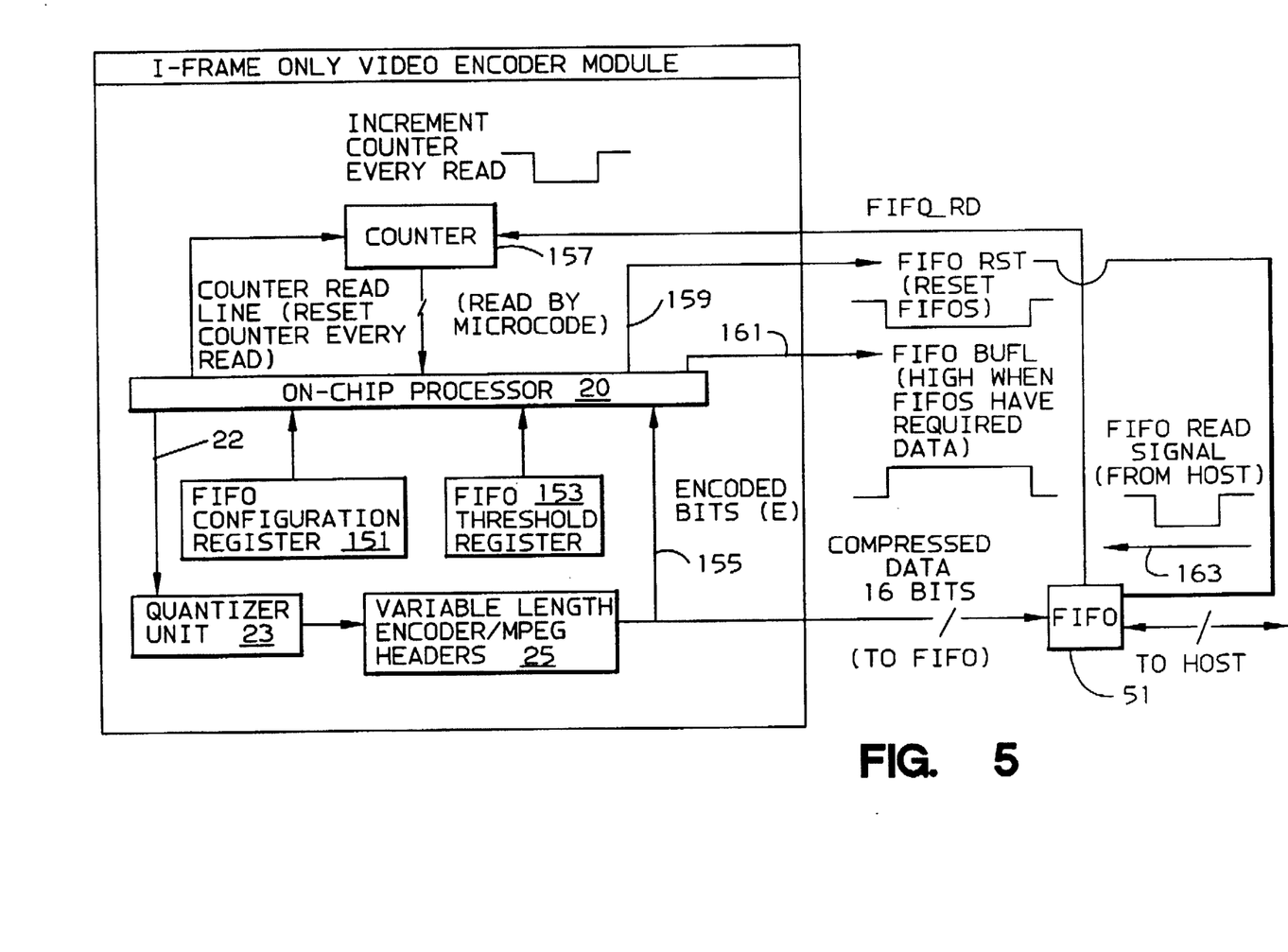
FIG. 5 shows the FIFO buffer monitoring and control system of the present invention.

Another factor which can be used to adjust the step size is the fullness of the external buffer, which in real time encoding systems is typically an external FIFO device. By monitoring the amount of data read from the FIFOs and data used to encode the bitstream (E), the bitrate can be adjusted to prevent overflow of the external buffers 51 in a normal operating environment.

To accomplish this, a read line (FIFO_RD) from the FIFOs is provided to a special pin on the I-frame video encoder module. Each time that the FIFOs are read an on-chip counter is incremented A FIFO configuration register is also provided containing information about the external FIFO configuration. The width (w) of the FIFO configuration is set in this register to 1, 2, 4, 8 or more bytes depending upon the application. The depth (d) of the external FIFO (in units of 1 k) is also provided in the configuration register. Using the read count (c) in the on-chip counter and FIFO width the number of bits read by the host (R) can be calculated:

$$R=(c*w)*8$$

where

R=number of bits read by the host, c=read count in the on-chip counter, and w=width of the memory.

Both the counter and the FIFO configuration register can be read using microcode. The microcode can then perform the R calculation.

In parallel, microcode can also monitor the number of bits encoded (E) and then subtract the amount of data read by the host (R). The result of this calculation (E-R) will determine the fullness of the external buffer (BF):

$$BF=E-R$$

Based on the depth (d) of the FIFO and system characteristics, an experimental limit (L) can be calculated and used to determine the point at which the bitrate should be adjusted to avoid buffer overrun. If BF>L then the stepsize will be increased allowing less bits for encoding. This will be monitored until the bitrate is adjusted such that BF<L. If an overrun does occur, a FIFO reset signal called FIFO_RST can be pulsed low to reset the external FIFOs.

A FIFO reset is issued at the start of the next encoding picture and the FIFO writing encoding process can then be restarted. The FIFO_RST signal is controlled with microcode and is set when microcode detects the overrun condition:

$$BF>(d*1024)*(w*8).$$

The amount of time that bitrate is adjusted can be changed using microcode depending upon the application. For the best adjustment, this should be monitored every macroblock but this requires more calculations for every macroblock. However, because of code flexibility, this can be reduced to multiple macroblocks or slices if required. A reset on read function for the FIFO counter can also be provided so that code does not have to reset the counter after every read. This reduces the amount of instructions needed to monitor the external buffer fullness.

Using the existing structure, this invention can also be modified to provide an indication to the host that the FIFO buffer has enough data present to begin reading. This is useful for applications where a block read of data to the host is required. A FIFO threshold register which contains the number of bytes required to be stored in the FIFO prior to read by the application is set through the host interface. The microcode can then read this register and compare it with the Buffer Fullness in bytes (BF/8). If BF/8 is greater than the number of bytes in the FIFO threshold register then a signal called FIFO_BUFL (FIFO Buffer Level) will be pulsed high indicating that the FIFO is ready to be read by the host.

A diagram of a FIFO buffer management system useful in this invention is shown in FIG. 5. As there shown, an on-chip processor, 20, receives inputs from a counter, for example, a 16 bit counter, 157, a FIFO buffer configuration register, 151, a FIFO threshold register 153, and the number of bits encoded, 155, by the variable length encoder/MPEG header generator 25, and a FIFO read signal 163 from the host. The outputs of the on-chip processor, 20, include a counter read line to reset the 16 bit counter, 157, after every read, a FIFO_RST reset line 159, a FIFO_BUFL which is set high when FIFOs have the required data, and the quantization constant or stepsize 22 to the quantizer 23. The output of the variable length encoder/MPEG header generator, 25, is compressed data, shown as 16 bit data, to the FIFO buffer 51. The output of the FIFO buffer, 51, is to the host or transmission medium.

The method of the invention is accomplished by an encoder substantially as shown in FIGS. 1 and 5, and further including a host (not shown) and a controller or processor (not shown). As there shown, an encoder is provided for encoding a digital video image stream. The encoder includes means for spatial compression of still images in the digital video image stream and means for temporal compression between the still images. These means may be combined, as shown in FIG. 1.

The means for spatial compression converts a time domain image of a macroblock into a frequency domain image of the macroblock, takes the discrete cosine transform of the frequency domain image in discrete cosine transformer 21, transforms the discrete cosine transformed macroblock image by a quantization factor in quantizer 23, and run length encodes the quantized discrete cosine transformed macroblock image in run length encoder 25. These elements are shown in FIG. 1.

The means for temporal compression, also shown in FIG. 1 reconstructs the run length encoded, quantized, discrete cosine transformed image of the macroblock in the inverse quantizer 29 and the inverse discrete cosine transformer 31, searches for a best match macroblock, and constructs a motion vector therebetween in the motion compensation means 41, the motion estimation means, 43, and the frame memory 42. The combination of the co-operative means for spatial compression and temporal compression forms a bitstream of runlength encoded, quantized, discrete cosine transformed macroblocks and motion vectors and passes the bitstream to and through a FIFO buffer 51 to a transmission medium. The FIFO buffer interacts to and through a processor or controller (not shown) to control aspects of the spatial compression as well as to provide a steady bitstream.

For example, in one embodiment of our invention the system controls FIFO buffer fullness to avoid loss of data. This is accomplished through the processor or controller (not shown). This may be accomplished by feeding back to the encoder the number of run length encoded bits, and calculating the quantization factor therefrom. This is accomplished by feedback from the FIFO buffer 51 to and through the processor or controller. The encoder can further programmably specify the FIFO buffer configuration. This allows the amount of data to be read out of the FIFO buffer per FIFO buffer read to be programmable, which is especially important when the amount of data read out of the FIFO buffer per FIFO read does not match the output buffer line width.

According to another embodiment of our invention the processor or controller of the encoder controls a FIFO buffer fullness limit in order to control the timing and amount of the quantization factor. This avoids FIFO buffer overflow and the loss of data.

The system shown in FIGS. 1 and 5 controls FIFO buffer 51 fullness to avoid loss of data and also resets the FIFO buffer 51 in the event of overflow to restart the FIFO read process.

The system shown in FIGS. 1 and 5 also controls the FIFO buffer 51 fullness and includes programmable within the processor or controller to specify the size of block data fullness so as to assist the host in the read operation of the buffer. This can include signaling the host when the FIFO buffer 51 contains enough data for a block transfer, and also specifying the size of block data fullness to assist the host, not shown, in the read operation of the FIFO buffer 51.

While the invention has been described with respect to certain preferred embodiments and exemplifications, it is not intended to limit the scope of the invention thereby, but solely by the claims appended hereto.

We claim:

1. In a method of encoding a digital video image stream in an encoder, comprising spatial compression of still images in the digital video image stream and temporal compression between the still images, wherein the spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image, wherein the temporal compression is carried out by reconstructing the run length encoded, quantized, discrete cosine transformed image of the macroblock, searching for a best match macroblock, and constructing a motion vector therebetween, to thereby form a bitstream comprising runlength encoded, quantized, discrete cosine transformed macroblocks and motion vectors, and passing the bitstream to and through a FIFO buffer to a transmission medium, the improvement comprising feeding back to the encoder the number of run length encoded bits and incrementing an on-chip counter each time that the FIFOs are read and calculating therefrom the number of bits read by the host (R), and comparing the number of run length encoded bits to the number of bits read and written into the FIFO buffer to monitor the number of bits encoded (E), and subtracting from the number of bits encoded (E) in the encoder the number of bits read by the host (R) to give the fullness of the external FIFO buffer (BF), calculating the quantization factor from the fullness of the external FIFO buffer, and thereby adjusting the bitrate from the encoder.

2. In a method of encoding a digital video image stream in an encoder, comprising spatial compression of still images in the digital video image stream and temporal compression between the still images, wherein the spatial compression is carried out by converting a time domain image of a macroblock to a frequency domain image of the macroblock, taking the discrete cosine transform of the frequency domain image, transforming the discrete cosine transformed macroblock image by a quantization factor, and run length encoding the quantized discrete cosine transformed macroblock image, wherein the temporal compression is carried out by reconstructing the run length encoded, quantized, discrete cosine transformed image of the macroblock, searching for a best match macroblock, and constructing a motion vector therebetween, to thereby form a bitstream comprising runlength encoded, quantized, discrete cosine transformed macroblocks and motion vectors, and passing the bitstream to and through a FIFO buffer to a transmission medium, the improvement comprising controlling FIFO buffer fullness to avoid loss of data by the method comprising feeding back to the encoder the number of run length encoded bits and incrementing an on-chip counter each time that the FIFOs are read and calculating therefrom the number of bits read by the host (R), and comparing the number of run length encoded bits to the number of bits read and written into the FIFO buffer to monitor the number of bits encoded (E), and subtracting from the number of bits encoded (E) in the encoder the number of bits read by the host (R) to give the fullness of the external FIFO buffer (BF), calculating the quantization factor from the fullness of the external FIFO buffer, and thereby adjusting the bitrate from the encoder.

3. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking the discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the run length encoded, quantized, discrete cosine transformed image of the macroblock, means for searching for a best match macroblock, and means for constructing a motion vector therebetween, said means for encoding a digital video image stream thereby forming a bitstream comprising runlength encoded, quantized, discrete cosine transformed macroblocks and motion vectors and passing the bitstream to and through an external FIFO buffer to a transmission medium, the improvement comprising means for feeding back to the encoder the number of run length encoded bits, means in the encoder for incrementing an on-chip counter each time that the external FIFO buffer is read and calculating therefrom the number of bits read by the host (R), means in the encoder for monitoring the number of bits encoded (E) and subtracting from the number of bits encoded (E) in the encoder the number of bits read by the host (R) to give the fullness of the external FIFO buffer (BF), said means controlling FIFO buffer fullness to avoid loss of data.

4. The encoder of claim 3 comprising means for calculating the quantization factor from the fullness of the external buffer (BF).

5. The encoder of claim 3 comprising programmable means for specifying the FIFO buffer configuration.

6. The encoder of claim 5 wherein the amount of data to be read out of the FIFO buffer per FIFO buffer read is programmable.

7. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking the discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the run length encoded, quantized, discrete cosine transformed image of the macroblock, means for searching for a best match macroblock, and means for constructing a motion vector therebetween, said means for encoding a digital video image stream thereby forming a bitstream comprising run-length encoded, quantized, discrete cosine transformed macroblocks and motion vectors and passing the bitstream to and through a FIFO buffer to a transmission medium, the improvement comprising means for feeding back to the encoder the number of run length encoded bits, means in the encoder for incrementing an on-chip counter each time that the external FIFO buffer is read and calculating therefrom the number of bits read by the host (R), means in the encoder for monitoring the number of bits encoded (E) and subtracting from the number of bits encoded (E) in the encoder the number of bits read by the host (R) to give the fullness of the external FIFO buffer (BF), said means controlling a FIFO buffer fullness limit to control the timing and amount of the quantization factor to thereby avoid loss of data.

8. An encoder for encoding a digital video image stream in an encoder, comprising means for spatial compression of still images in the digital video image stream and means for temporal compression between the still images, wherein the means for spatial compression comprises means for converting a time domain image of a macroblock to a frequency domain image of the macroblock, means for taking the discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the run length encoded, quantized, discrete cosine transformed image of the macroblock, means for searching for a best match macroblock, and means for constructing a motion vector therebetween, said means for encoding a digital video image stream thereby forming a bitstream comprising run-length encoded, quantized, discrete cosine transformed macroblocks and motion vectors and passing the bitstream to and through a FIFO buffer to a transmission medium, the improvement comprising means for feeding back to the encoder the number of run length encoded bits, means in the encoder for incrementing an on-chip counter each time that the external FIFO buffer is read and calculating therefrom the number of bits read by the host (R), means in the encoder for monitoring the number of bits encoded (E) and subtracting from the number of bits encoded (E) in the encoder the number of bits read by the host (R) to give the fullness of the external FIFO buffer (BF), and means to reset the buffer in the event of overflow to restart the FIFO read process.

9. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking the discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the run length encoded, quantized, discrete cosine transformed image of the macroblock, means for searching for a best match macroblock, and means for constructing a motion vector therebetween, said means for encoding a digital video image stream thereby forming a bitstream comprising run-length encoded, quantized, discrete cosine transformed macroblocks and motion vectors and passing the bitstream to and through a FIFO buffer to a transmission medium, the improvement comprising means for controlling FIFO buffer fullness including means for feeding back to the encoder the number of run length encoded bits, means in the encoder for incrementing an on-chip counter each time that the external FIFO buffer is read and calculating therefrom the number of bits read by the host (R), means in the encoder for monitoring the number of bits encoded (E) and subtracting from the number of bits encoded (E) in the encoder the number of bits read by the host (R) to give the fullness of the external FIFO buffer (BF), and programmable means to specify the size of block data fullness to assist the host in the read operation of the buffer.

10. The encoder of claim 9 comprising a FIFO buffer counter and reset on read means for the FIFO buffer counter whereby code does not reset the counter after every read.

11. An encoder for encoding a digital video image stream in the encoder, comprising means for spatial compression of still images in the digital video image stream and means for temporal compression between the still images, wherein the means for spatial compression comprises means for converting a time domain image of a macroblock to a frequency domain image of the macroblock, means for taking the discrete cosine transform of the frequency domain image, means for transforming the discrete cosine transformed macroblock image by a quantization factor, and means for run length encoding the quantized discrete cosine transformed macroblock image, wherein the means for temporal compression comprises means for reconstructing the run length encoded, quantized, discrete cosine transformed image of the macroblock, means for searching for a best match macroblock, and means for constructing a motion vector therebetween, said means for encoding a digital video image stream thereby forming a bitstream comprising run-length encoded, quantized, discrete cosine transformed macroblocks and motion vectors and passing the bitstream to and through a FIFO buffer to a transmission medium, the improvement comprising:

means for controlling FIFO buffer fullness, including means for feeding back to the encoder the number of run length encoded bits, means in the encoder for incrementing an on-chip counter each time that the external FIFO buffer is read and calculating therefrom the number of bits read by the host (R), means in the encoder for monitoring the number of bits encoded (E) and subtracting from the number of bits encoded (E) in the encoder the number of bits read by the host (R) to give the fullness of the external FIFO buffer (BF), means to signal the host when the FIFO buffer contains enough data for a block transfer, and programmable means to specify the size of block data fullness to assist the host in the read operation of the buffer.

* * * * *